United States Patent [19]

Peckerar et al.

[11] Patent Number: 4,849,925
[45] Date of Patent: Jul. 18, 1989

[54] MAXIMUM ENTROPY DECONVOLVER CIRCUIT BASED ON NEURAL NET PRINCIPLES

[75] Inventors: Martin C. Peckerar, Silver Spring; Christie R. K. Marrian, Marbury, both of Md.

[73] Assignee: The United States of America as represented by the Secretary of the Navy, Washington, D.C.

[21] Appl. No.: 144,141

[22] Filed: Jan. 15, 1988

[51] Int. Cl.$^4$ .......................... G06G 7/19; G06G 9/00
[52] U.S. Cl. ..................................... 364/819; 364/807
[58] Field of Search ............... 364/819, 824, 807, 513, 364/300, 133; 307/402, 201

[56] References Cited

U.S. PATENT DOCUMENTS

| | | | |
|---|---|---|---|
| 4,660,166 | 4/1987 | Hopfield | 364/807 |
| 4,730,259 | 3/1988 | Gallant | 364/513 |
| 4,731,747 | 3/1988 | Denker | 364/807 |
| 4,737,929 | 4/1988 | Denker | 364/807 |
| 4,752,906 | 6/1988 | Kleinfield | 364/807 |
| 4,782,460 | 11/1980 | Spencer | 364/807 |

OTHER PUBLICATIONS

D. W. Tank and J. J. Hopfield, "Simple 'Neural' Optimization Networks: an AD Converter, Signal Decision Circuit, and a Linear Programming Circuit", vol. CA-S-33, No. 5, May, 1986.

J. J. Hopfield, "Neurons With Graded Response Have Collective Computational Properties Like Those of Two-State Neurons", Proceeding of the National Academy of Sciences (U.S.A.), vol. 81, pp. 3088-3092, May, 1984.

Primary Examiner—Joseph Ruggiero
Assistant Examiner—Charles B. Meyer
Attorney, Agent, or Firm—Thomas E. McDonnell; Edward F. Miles

[57] ABSTRACT

Disclosed are two modifications of the Tank-Hopfield circuit, each of which enables the deconvolution of a signal in the presence of noise. In each embodiment, the Tank-Hopfield circuit is modified so that the equation for total circuit energy reduces to one term representing convolution and another information theoretic (or Shannon) entropy. Thus, in finding its global minimum energy state, each modified circuit inherently identifies an optimal estimate of a deconvoluted input signal without noise.

6 Claims, 3 Drawing Sheets

MAXIMUM ENTROPY DECONVOLVER CIRCUIT BASED ON NEURAL NET PRINCIPLES

FIELD OF THE INVENTION

The invention pertains to communications and signal processing, and more particularly to signal deconvolution in the presence of noise.

BACKGROUND OF THE INVENTION

The convolution of a discretely sampled signal can be expressed in matrix-algebra form as:

$$\overline{\overline{D}}\overline{V} = \overline{B} \text{ or } \overline{\overline{D}}\overline{V} - \overline{B} = \overline{0}$$

where $\overline{V}$ is the input signal to a system having transfer function matrix $\overline{\overline{D}}$, and, $\overline{B}$ is the system's output. (Matrices are indicated by a double top-arrow, vectors by a single arrow.) A commonplace problem in signal processing is, given a particular system output $\overline{B}$, define the input $\overline{V}$. The most straightforward solution to this problem is simply to calculate the inverse $\overline{\overline{D}}^{-1}$ of transfer function $\overline{\overline{D}}$, and to calculate $\overline{V}$ directly. Unfortunately, if all the vectors of D are not linearly independent, or if $\overline{\overline{D}}$ itself is only poorly known, this calculation is impossible. Moreover, system noise distorts signal $\overline{V}$ so that the apparent system input signal $\overline{A}$ is not readily deconvolved, i.e., $\overline{\overline{D}}\overline{A} - \overline{B} = \overline{0}$ has no unique solution.

Tank and Hopfield have proposed a circuit (See D. W. Tank and J. J. Hopfield, "Simple Optimization Networks: An A/D Converter, Signal Decision Circuit, and a Linear Programming Circuit," IEEE Transactions on Circuits and Systems, Vol. Cas $-33$, No. 5, May, 1986) shown in FIG. 1, which is of interest to the deconvolution problem. The Tank-Hopfield circuit is an example of a neural network, i.e., a multiply connected array of amplifier circuits. The particular circuit of FIG. 1 was designed to minimize a cost function $\overline{A} \cdot \overline{V}$ (the dot product of vectors $\overline{A}$ and $\overline{V}$) under the additional constraint that $\overline{\overline{D}}\overline{V} - \overline{B} = \overline{0}$, i.e. that $\overline{\overline{D}}\overline{V} - \overline{B}$ be minimized. $\overline{A}$ and $\overline{V}$ are nth order vectors, in which the components $\overline{A}_i$ of A represent fixed costs, and the components $V_i$ of $\overline{V}$ represents variable costs; $\overline{B}$ is an mth order vector in which components $B_j$ of $\overline{B}$ represent constraints on the optimization of $\overline{A} \cdot \overline{V}$, and $\overline{\overline{D}}$ is an m by n order matrix whose elements $D_{ji}$ describe the informational interrelation between the cost function and the constraint function.

The Tank-Hopfield circuit of FIG. 1 contains two portions separated from one another by dotted lines and labeled, respectively, as the Variable Plane and the Constraint Plane. The inputs to the Variable Plane are the components $\overline{A}_1$ through $A_n$ of vector A, and the output the components $V_1$ through $V_n$ of vector $\overline{V}$. Similarly, the inputs to the Constraint Plane are the components $B_1$ through $B_m$ of constraint vector $\overline{B}$, and the outputs of the Constraint Plane have no significance other than as feedbacks to the Variable Plane. In FIG. 1, heavy dots indicate electrical connections, i.e. circuit nodes. Such nodes that are labeled with some $D_{ji}$ also have a conductance of magnitude $D_{ji}$, through which flows each current incident upon the node. Each $D_{ji}$ represents the conductance among the inputs and outputs of the jth amplifier of the Constraint Plane and the ith amplifier of the Variable Plane, a negative sign associated with any $D_{ji}$ indicating negative feedback. The individual $D_{ji}$'s represent the elements of matrix (or Kernel) $\overline{\overline{D}}$. Tank and Hopfield showed that the total energy dissipation (or power consumption), E, of the circuit shown in FIG. 1 is expressed by:

$$E = \overline{A} \cdot \overline{B} + \sum_{j=1}^{m} F(\overline{D_j}\overline{V} - B) + \sum_{i=1}^{n} (1/R_i) \int_{0}^{V_i} g^{-1}(V) dV$$

where $\overline{D_j}$ is the jth column of matrix $\overline{\overline{D}}$, g is the transfer function of the Variable Plane amplifiers, $R_i$ is the ith resistor of resistors $R_1$ through $R_n$ shown in RC network 30 of FIG. 1, and F is an error function indicating deviation from the condition $\overline{\overline{D}}\overline{V} - \overline{B} = \overline{0}$. This equation is commonly referred to as the "energy function" or "Lyopunov function" of the system. The above expression for E assumes that the amplifiers' outputs dissipate energy only within the feedback loops of the circuit itself. This is a good assumption, because the outputs of the constraint plane amplifiers are not coupled to external, power dissipating components. The outputs of the variable plane amplifiers (i.e., $\overline{V}$), need drive only circuitry that monitors voltage. Such circuits, like any well-designed voltage monitoring circuit, should be of very high input impedance so that the voltages monitored will be substantially unperturbed. The only requisites of F are that $F(\overline{0}) = 0$, and that $F(\overline{z})$ for $\overline{z} \neq \overline{0}$ be a positive quantity. By inspection of FIG. 1, one can see that the circuit feeds back from the variable $\overline{\overline{D}}\overline{V}$ plane to the m inputs of the constraint plane, summing them there, with the inputs B. In this way the circuit power dissipation contains a term which depends on $\overline{\overline{D}}\overline{V} - \overline{B}$. Thus, the particular form of F is defined by the particular transfer functions of the constraint plane amplifiers. Tank and Hopfield showed that for a given $\overline{\overline{D}}$ and $\overline{B}$, the output $\overline{V}$, will spontaneously adjust so that the energy function E tends towards (and reaches) a global minimum, minimizing cost function A.V under the given constraints. Especially noteworthy about the Tank-Hopfield circuit is that the constraint equation $\overline{\overline{D}}\overline{V} - \overline{B} = \overline{0}$ under which the cost function is globally optimized is in the form of a convolution, suggesting that the Tank-Hopfield circuit can be modified to perform deconvolution of a discretely sampled signal without having to calculate the inverse $\overline{\overline{D}}^{-1}$ of $\overline{\overline{D}}$.

SUMMARY OF THE INVENTION

Accordingly, it is an object of the invention to modify the Tank-Hopfield circuit so that it can deconvolve discretely sampled signals.

Another object of the invention is to do this deconvolution despite the presence of noise.

Another object of the invention is to do this deconvolution despite zeros existing in the determinant of system transfer functions, or the system transfer function being poorly known, i.e. to perform deconvolution without requiring the calculation of the transfer function's inverse.

In accordance with these and other objects that shall become apparent hereinafter, the Tank-Hopfield circuit is modified by selecting certain components of the circuit to make selected terms of the equation for E vanishingly small. In so doing, one reduces the equation for E to two terms, one involving an expression in the form of a convolution $(\overline{\overline{D}}\overline{V} - \overline{B})$, the other a so-called "regularizer." By further selection of circuit components, the regularizer term becomes $$-\sum_{i=1}^{m} V_i \log(V_i),$$

so that the expression for E becomes:

$$E = -\sum_{i=1}^{m} V_i \log(V_i) + \sum_{j=1}^{m} F(\overline{D_j V} - \overline{B})$$

The regularizer term $$-\sum_{i=1}^{m} V_i \log(V_i)$$

is in the form of the information theoretic (Shannon) entropy of $\overline{V}$, which is a measure of the randomness of $\overline{V}$. An estimate of the deconvolved signal with maximum Shannon entropy is termed a "most-likely" signal reconstruction satisfying the constraints imposed by the observation. If the elements of $\overline{A}$ represent a discretely sampled noisy signal input into a system, the elements of $\overline{B}$ the discretely sampled output of the system responsive to $\overline{A}$, and the transconductance elements of $\overline{D}$ are chosen to represent the system's transfer function as best known, then as the circuit reaches its global minimum in E the steady state values of the elements of $\overline{V}$ represent the pixels of the signal that comes closest to satisfying the convolution expression while at the same time having maximum information theoretic entropy, i.e., the best available estimate of $\overline{A}$. Such estimates tend to smooth the signal, apparently eliminating noise. This process is called maximum entropy deconvolution. The incorporation of such a regularizer was not contemplated by the original Tank-Hopfield design. In one embodiment, the output loads $R_i$ are made large so that $$\sum_{i=1}^{m} (1/R_i) \int_{0}^{V_i} g^{-1}(V) dV \approx 0,$$

and an additional feedback loop is introduced for each amplifier in the variable plane so that the term $$\overline{A} \cdot \overline{V} = \sum_{i=1}^{m} V_i \log(V_i).$$

The negative sign implies negative feedback, which mandates that F and $\overline{A} \cdot \overline{V}$ will always be of opposite sign. This allows for concurrent minimization of the constraint term (F) and maximization of the entropy term $(\overline{A} \cdot \overline{V})$.

The second embodiment performs much the same function 16 by requiring that the input currents $A_1$ to $A_n$ be very small so that the term in the equation for E of $\overline{A} \cdot \overline{V}$ becomes vanishingly small. The transfer functions g of the amplifiers in the variable plane are chosen as exponentials, the result of which being that the term of the equation for E depending upon $$\sum_{i=1}^{m} (1/R_i) \int_{0}^{V} g^{-1}(V) dV$$

reduces to the form $$\sum_{i=1}^{m} V_i \log(V_i),$$

which is, again, the information theoretic entropy, and again the Tank-Hopfield circuit optimizes this quantity under the constraint that deconvolution occurs.

It is also possible to adjust the relative weights of the constraint and entropy terms by simply multiplying the log term by some number (greater or less than 1). Such adjustment allows for the smallest possible value of the energy function to be obtained at the end of the deconvolution. This adjustment, when performed in real time, allows for continuous adjustment of the circuit to a changing noise statistic.

The invention and many of its attendant advantages are more fully understood from the following detailed description of preferred embodiments, it being understood, however, that the invention is capable of extended application beyond the precise details of preferred 16 embodiments. Changes and modifications can be made that do not affect the spirit of the invention, nor exceed its scope, as expressed in the appended claims. Accordingly, the preferred embodiments are now described with particular reference to the drawing figures, wherein:

DETAILED DESCRIPTION OF THE PREFERRED EMBODIMENTS

Figure 1:
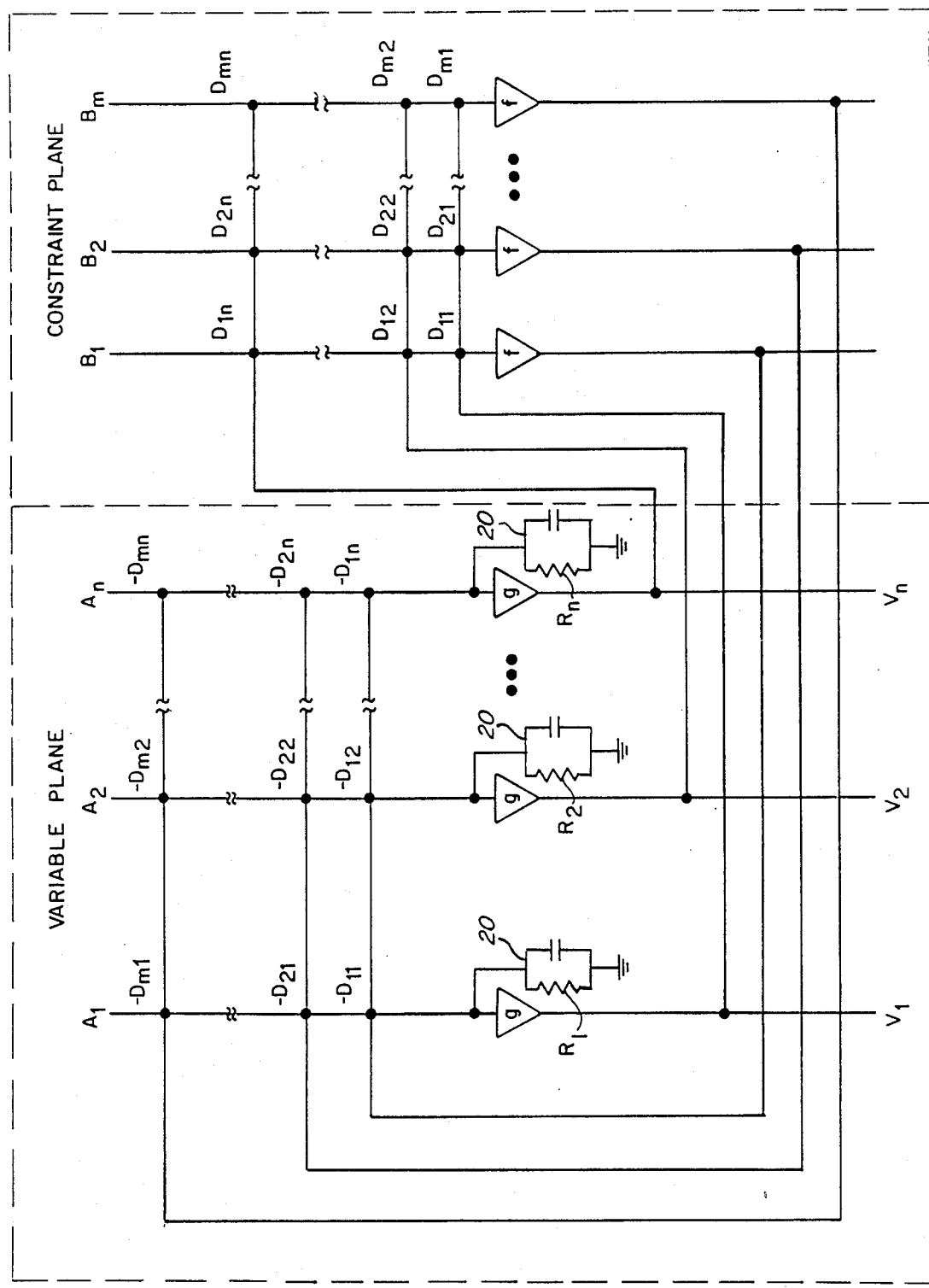
FIG. 1 is a circuit schematic of the Tank-Hopfield circuit as above described.

The invention is now described with reference to the drawings figures, wherein like reference numerals and characters indicate identical or corresponding parts throughout the several views, and particularly to FIG. 1 which shows the Tank-Hopfield circuit referred to above. As discussed above, the circuit is a highly interconnected neural net comprising two parts set off by dotted lines, one part called the Variable Plane, the other the Constraint Plane. The Variable Plane contains a plurality of n amplifiers each having a transfer function g, the Constraint Plane has a plurality of m amplifiers each having the transfer function f. The output of each amplifier in one plane is fed back into the input node of each amplifier in the other plane through a transconductance $D_{ji}$ which represents a conductance among inputs and outputs of the jth amplifier of the Constraint Plane and the ith amplifier of the Variable Plane, negative signs indicating negative feedback. The magnitude of these conductances $D_{ji}$ are chosen to simulate the components of a matrix $\overline{D}$. Each amplifier in the Variable Plane has associated with it an RC network 20 which delays feedback signals from the Constraint Plane so that the response of the Variable Plane to feedback from the Constraint Plane lags by a preselected time corresponding to the time constant of the RC circuit. In this way, the F term in the energy equation E is realized. Inputs $A_i$ through $A_n$ are introduced as indicated in FIG. 1 as currents into the Variable Plane, the magnitude of these currents corresponding to the components of vector $\overline{A}$, similarly, currents corresponding to the elements of vector $\overline{B}$ are fed into the inputs of the Constraint Plane amplifiers. The components of $\overline{B}$ represent the magnitude of the discrete elements of the sampled signal. The outputs $V_1$ through $V_n$ of the Variable Plane correspond to the elements of the deconvoluted, noise cancelled, signal $\overline{V}$, as described above.

In operation, the states of this circuit will evolve, as discussed above, to minimize its total energy E, ultimately reaching a steady state value of the components $V_i$ of vector $\overline{V}$.

Figure 2:
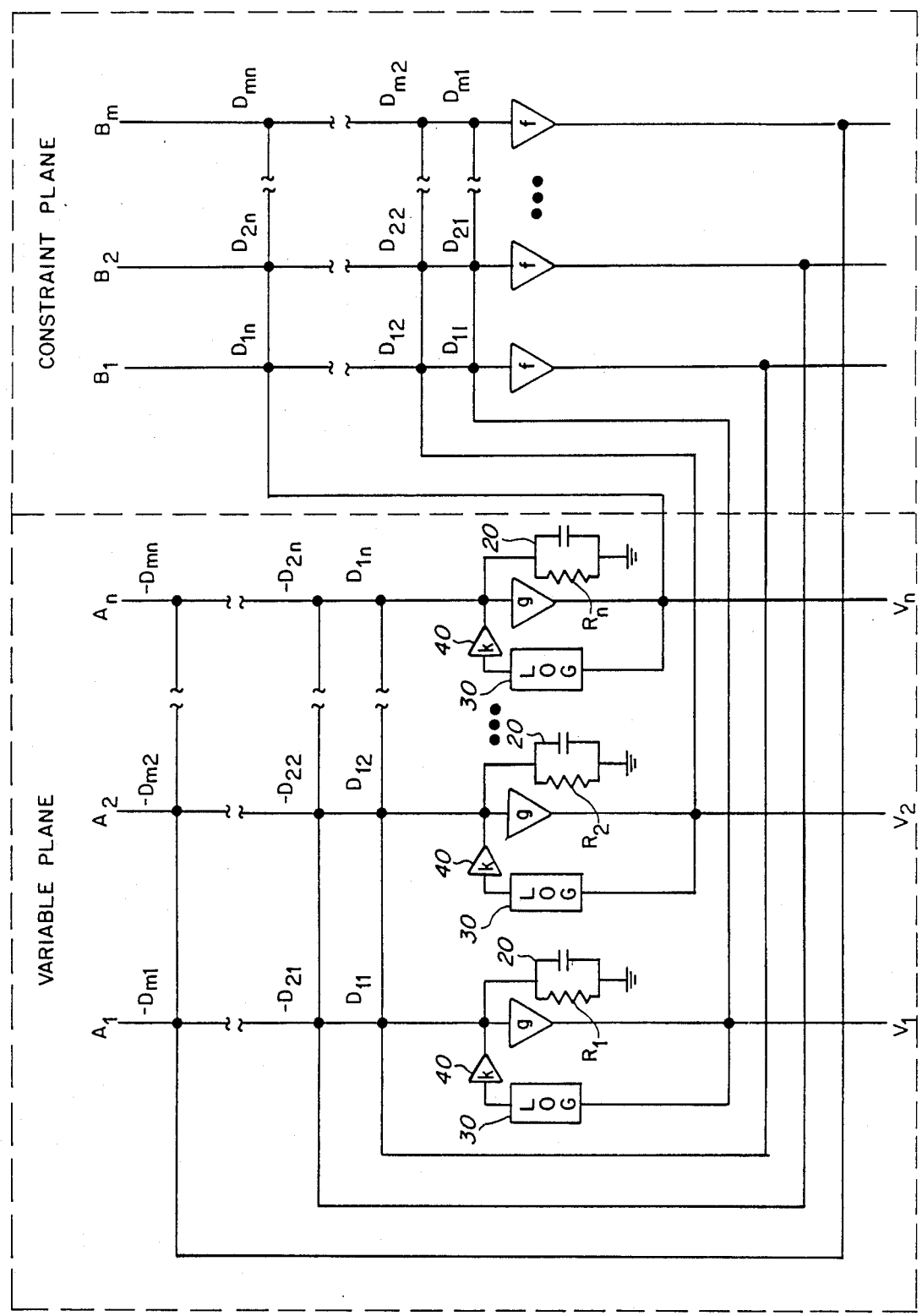
FIG. 2 is a circuit schematic of the Tank-Hopfield circuit modified in accordance with one embodiment of the instant invention.

With particular reference to FIG. 2, the circuit of FIG. 1 is varied in accordance with one embodiment of the instant invention. The circuit of FIG. 2 is identical to that of FIG. 1 except that additional feedback loops 30 in the Variable Plane are associated with each amplifier for the Variable Plane. The active elements in feedback loop 30 can be any conventional circuitry that converts a given input to the logarithm of that input. Amplifiers 40 multiply the logarithmic feedback by a constant, although adjustable, gain k. Feedback loop 30 imposes a further constraint on the amplifiers of the Variable Plane that the input to each amplifier is equal to the negative of the logarithm of that amplifier's output. For gain k=1 for amplifier 40, this further constrains the cost equation such that $$\overline{A}.\overline{V} = \sum_{i=1}^{m} V_i \log(V_i),$$

which is the information theoretic entropy of the output $\overline{V}$. Additionally, the resistors $R_1$ through $R_n$ are made very large so that the power dissipation term in the energy equation for the circuit of FIG. 2 becomes vanishingly small i.e.:

$$\sum_{i=1}^{m} (1/R_i) \int_0^{V_i} g^{-1}(V) dV = 0.$$

This being the case, the total energy of the circuit in FIG. 2 becomes:

$$E = -\sum_{i=1}^{m} V_i \log(V_i) + \sum_{j=1}^{m} F(\overline{D}_j \overline{V} - \overline{B})$$

Those skilled in the electronics art understand what is meant by vanishingly small, and how to choose electronic components to make any signal vanishing small. If the components of B are set to represent magnitudes obtained by discretely sampling a noise-distorted signal incident upon a system having a transfer function $\overline{D}$ whose components correspond to circuit conductances $D_{ji}$ then the steady-state components of $\overline{V}$ represent the optimal estimate of corresponding magnitudes of a signal that both satisfies the convolution equation and has maximum information theoretic entropy (randomness), i.e., the most likely estimate of $\overline{A}$ in light of other constraints imposed by the observation of the signal.

The transfer function g of the constraint plane amplifiers is preferably exponential, which, besides satisfying the overall circuit requirements of F, contributes to stability of the circuit of FIG. 2. Exponential amplifiers are well-known to those skilled in the art, and are easily constructed from a diode's output feeding a linear operational amplifier, thus generating an output that follows the exponential diode equation.

A variation upon this has gain $k \geq o$ of amplifiers 40 so that the term $\overline{A}.\overline{V}$ of E becomes $$\sum_{i=1}^{m} kV_i \log(V_i).$$

As before, each term of the summation is proportional to the Shannon entropy contribution of each element of $\overline{V}$. This weights the relative importance of the entropy term of $\overline{A}.\overline{V}$ with respect to the constraint term $(F(\overline{D}_j\overline{V}-\overline{B}))$, enabling one to obtain the smallest possible value of E as the circuit reaches its global minimum, as discussed above. As is seen from the equation for E, setting $\overline{A}.\overline{V}=\overline{o}$ requires the circuit to reach global minimum under no limitation from the log term, i.e., under no correction for noise. Thus the magnitude of the term $\overline{A}.\overline{V}$ represents the degree of uncertainty one has about the accuracy of $\overline{A}$, i.e., the degree that noise has distorted $\overline{A}$. By having k variable, one can adjust $\overline{A}.\overline{V}$ to, e.g., compensate for a system whose noise varies over time.

Figure 3:
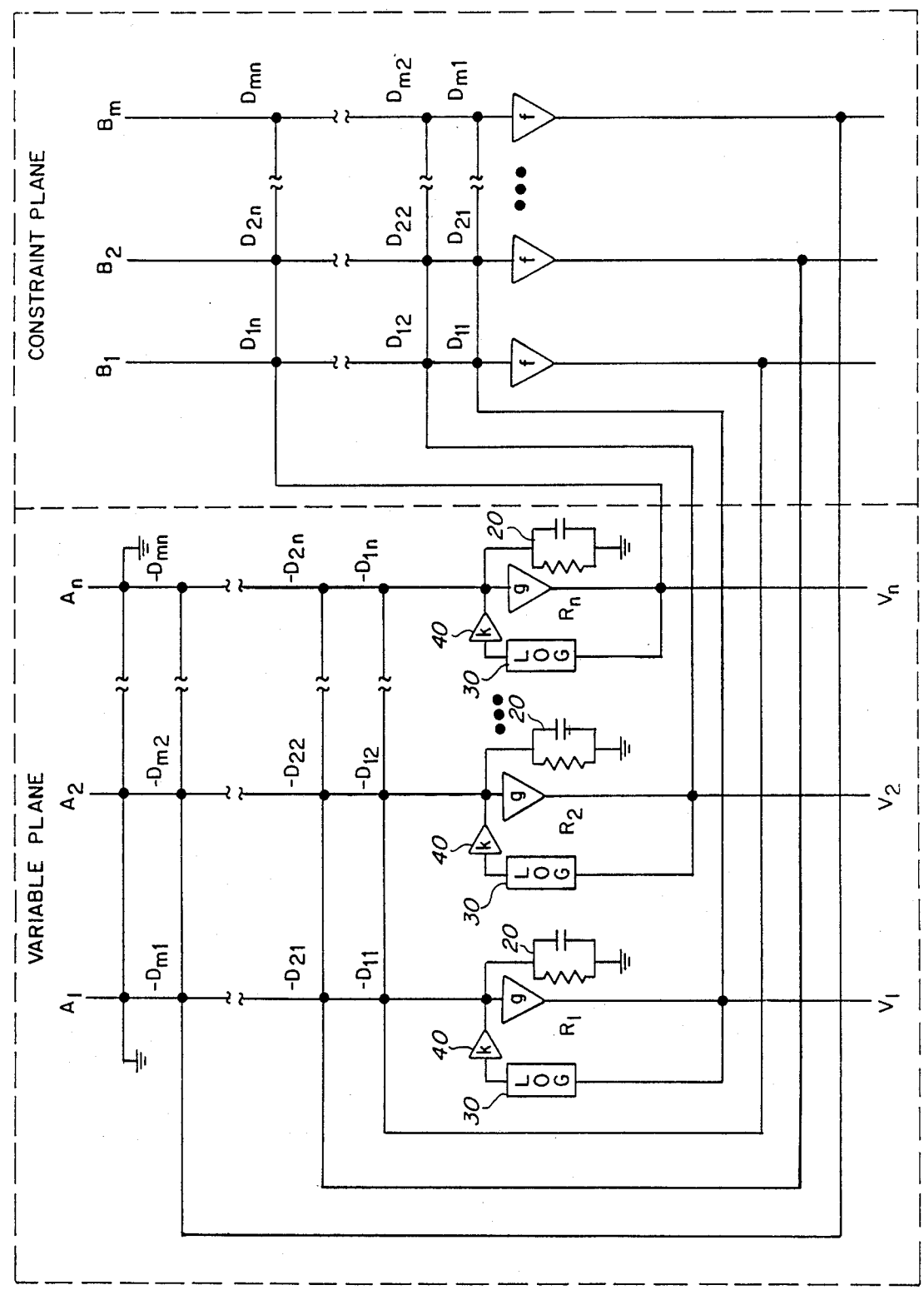
FIG. 3 is a circuit schematic of the Tank-Hopfield circuit modified in accordance with another embodiment of the instant invention.

An alternative embodiment of the invention, shown in FIG. 3, employs the circuit of FIG. 1, but under the additional constraint that the components $A_i$ of vector $\overline{A}$ be made vanishingly small so that the term $\overline{A}.\overline{V}$ of the equation E become vanishingly small. This can be done in any number of ways, the most straightforward of which is to ground $A_1$ through $A_n$ (as shown in FIG. 3). The transfer function g of the amplifiers of the Variable Plane is again chosen as an exponential function of input. Thus, if $g(V)=e^{\lambda V}$, and $g^{-1}(V)=\log(\lambda V)$, then the energy equation for the circuit in FIG. 1 becomes:

$$E = \sum_{j=1}^{m} F(\overline{D}_j\overline{V} - \overline{B}) - \sum_{i=1}^{m} (1/R_i) \int_0^{V_i} \log(\lambda V) dV$$

which becomes, upon evaluating the integral in the right hand term:

$$E = \sum_{j=1}^{m} F(\overline{D}_j\overline{V} - \overline{B}) - \sum_{i=1}^{m} (1/R_i) V_i \log(V_i)$$

Thus, under the constraint that the components of $\overline{A}$ be vanishingly small, the energy equation E reduces to the same form as in the first embodiment of this invention, i.e., one term representing convolution and the other representing information theoretic entropy of $\overline{V}$. The circuit of FIG. 3 proceeds to deconvolve in the identical manner as does the first embodiment of this invention (FIG. 2).

Numerous additional modifications and variations of the present invention are possible in view of the above teachings. Thus, within the scope of the appended claims, the invention may be practiced otherwise than specifically described herein. For example, by changing the nature of the feedback term $\overline{A}$, and making the response function of the variable plane amplifiers different regularizers can be implemented (other that those employing Shannon entropy). Furthermore, by utilizing the second embodiment of the circuit (wherein the $R_i$'s dissipate significant power) and by feeding currents $A_i$ which are proportional to prior estimates of the signal, maximization of signal cross-entropy can be accomplished. This is a technique which makes maximum use of measurements made prior to the actual signal observation.

What is claimed and desired to be secured by Letters Patent of the United Stated is:

1. A circuit comprising:
   a plurality of n amplifiers, called variable plane amplifiers, the outputs of respective ones of said variable plane amplifiers being $V_1$ through $V_n$, said $V_1$ through $V_n$ being the elements of a vector $\overline{V}$;
   a plurality of m amplifiers, called constraint plane amplifiers;
   a plurality of transconductances $D_{ji}$ interconnecting various inputs and outputs of said amplifiers, the values of the elements of said plurality of transconductances being arrangable in an mxn matrix $\overline{\overline{D}}$;
   a plurality of inputs $A_1$ through $A_n$ to respective ones of said variable plane amplifiers, said $A_1$ through $A_n$ being the elements of vector $\overline{A}$;
   a plurality of inputs $B_1$ through $B_m$ to respective constraint plane amplifiers, said $B_1$ through $B_m$ being the elements of vector $\overline{B}$;
   a plurality of n impedances, each of said n impedances connected to the input of a respective one of said n variable plane amplifiers, the real portion of each said n impedances being respectively $R_1$ through $R_n$;
   said circuit being adapted to have a total circuit energy E according to:

$$E = \overline{A} \cdot \overline{V} + \sum_{j=1}^{m} F(\overline{D}_j \overline{V} - \overline{B}) + \sum_{i=1}^{n} (1/R_i) \int_{o}^{V_i} g^{-1}(V) dV$$

where $\overline{D}_j$ is the jth column vector of said $\overline{\overline{D}}$, and $F(\overline{0})=0$, and $F>0$ for $\overline{z} \neq 0$;

wherein said circuit is adapted to reduce said circuit energy E to:

$$E = -\sum_{i=1}^{n} kV_i \log(V_i) + \sum_{j=1}^{m} F(\overline{D}_j \overline{V} - \overline{B}).$$

2. The circuit of claim 1, wherein the values of said $R_i$ through $R_n$ are selected sufficiently large to make the term $$\sum_{i=1}^{n} (1/R_i) \int_{o}^{V_i} g^{-1}(V) dV$$

of said circuit energy E vanishingly small;
   said circuit further comprises n logarithmic negative feedback loops, each of said logarithmic feedback loops connected between the output and the input of a respective amplifier of said n variable plane amplifiers effective to make said input of each said respective amplifier proportional to the logarithm of said output of each said respective amplifier;
   said logarithmic feedback loops and said values of said $R_i$ through $R_n$ being effective to reduce said expression for said circuit energy E to:

$$E = -\sum_{i=1}^{n} kV_i \log(V_i) + \sum_{j=1}^{m} F(\overline{D}_j \overline{V} - \overline{B}).$$

3. The circuit of claim 1 wherein said elements of said $\overline{A}$ are restricted effective to make $\overline{A} \cdot \overline{V}$ of said total circuit energy E vanishingly small;
   each said variable plane amplifier is an exponential amplifier; and
   such restriction of said elements of said $\overline{A}$, and said each said variable plane amplifier being exponential, being effective to reduce said expression for said circuit energy E to:

$$E = -\sum_{i=1}^{n} (1/R_i) V_i \log(V_i) + \sum_{j=1}^{m} F(\overline{D}_j \overline{V} - \overline{B}).$$

4. The circuit of claim 3 wherein each said $A_1$ through $A_n$ is grounded.

5. The circuit of claim 2, wherein each said logarithmic feedback loop comprises an electric series linear amplifier having a preselectedly variable gain equal to said k, said linear amplifier and said gain equal to k of said each said logarithmic feedback loop being effective to cause the ratio between the output and the input of the ith of said variable plane amplifiers to be $kV_i \log(V_i)$, where i is an integer between 1 and n inclusive.

6. In a neural net circuit of the Tank-Hopfield kind, said circuit comprising:
   a plurality of n amplifiers called variable plane amplifiers, said n amplifiers having outputs $V_1$ through $V_n$ respectively forming the elements of a vector $\overline{V}$, said n amplifiers having inputs $A_1$ through $A_n$ respectively forming the elements of a vector $\overline{A}$, said n amplifiers having impedances 1 through n respectively in electric parallel with said inputs $A_1$ through $A_n$ respectively, the real portions of said impedances being $R_1$ through $R_n$ respectively, the inverse function of the transfer function of each of said n amplifiers being $g^{-1}$; and
   a plurality of m amplifiers called constraint plane amplifiers having respective inputs $B_1$ through $B_m$ forming the elements of vector $\overline{B}$;
   wherein the feedback transconductance matrix of said circuit is $\overline{\overline{D}}$;
   wherein said circuit is adapted to cause the total energy of said circuit to be:

$$E = \overline{A} \cdot \overline{V} + \sum_{j=1}^{m} F(\overline{D}_j \overline{V} - \overline{B}) + \sum_{i=1}^{n} (1/R_i) \int_{o}^{V_i} g^{-1}(V) dV$$

where $\overline{D}_j$ is the jth column of said $\overline{\overline{D}}$, and F is a function such that $F(\overline{0})=0$, $F(z)>0$ for $z \neq 0$;
   wherein the improvement comprises circuit means for reducing said circuit energy E to:

$$E = -\sum_{i=1}^{n} kV_i \log(V_i) + \sum_{j=1}^{m} F(\overline{D}_j \overline{V} - \overline{B})$$

where k is a constant.

* * * * *